United States Patent [19]

Shirai et al.

[11] Patent Number: 4,745,461
[45] Date of Patent: May 17, 1988

[54] R,G,B LEVEL CONTROL IN A LIQUID CRYSTAL TV USING AVERAGE OF COMPOSITE VIDEO SIGNAL

[75] Inventors: Fujio Shirai; Takahiro Fuse, both of Tokyo, Japan

[73] Assignee: Casio Computer Co., Ltd., Tokyo, Japan

[21] Appl. No.: 23,484

[22] Filed: Mar. 9, 1987

[30] Foreign Application Priority Data

Apr. 11, 1986 [JP] Japan ................... 61-83821

[51] Int. Cl.⁴ .............................................. H04N 9/68
[52] U.S. Cl. ................................. 358/21 R; 358/27;
358/32; 358/59; 358/179; 358/236
[58] Field of Search ................... 358/21 R, 27, 34, 56,
358/59, 60, 65, 175, 179, 236, 169, 172

[56] References Cited

U.S. PATENT DOCUMENTS

| | | | |
|---|---|---|---|
| 4,403,253 | 9/1983 | Morris et al. | 358/169 |
| 4,523,232 | 6/1985 | Kameda et al. | 358/236 |
| 4,642,693 | 2/1987 | Fuse et al. | 358/236 |
| 4,642,694 | 2/1987 | Yamagishi et al. | 358/236 |

FOREIGN PATENT DOCUMENTS 198095  11/1984  Japan .................................. 358/56

Primary Examiner—John W. Shepperd
Attorney, Agent, or Firm—Frishauf, Holtz, Goodman & Woodward

[57] ABSTRACT

A circuit is disclosed which, in order to perform a faithful color reproduction, controls the level of a color video signal on a liquid crystal television receiver by uniformly amplifying primary color signals R, G and B in accordance with an average of composite color video signal and, after passing through a clamping circuit to obtain an aligned pedestal level, subjecting them to A/D conversion.

4 Claims, 3 Drawing Sheets

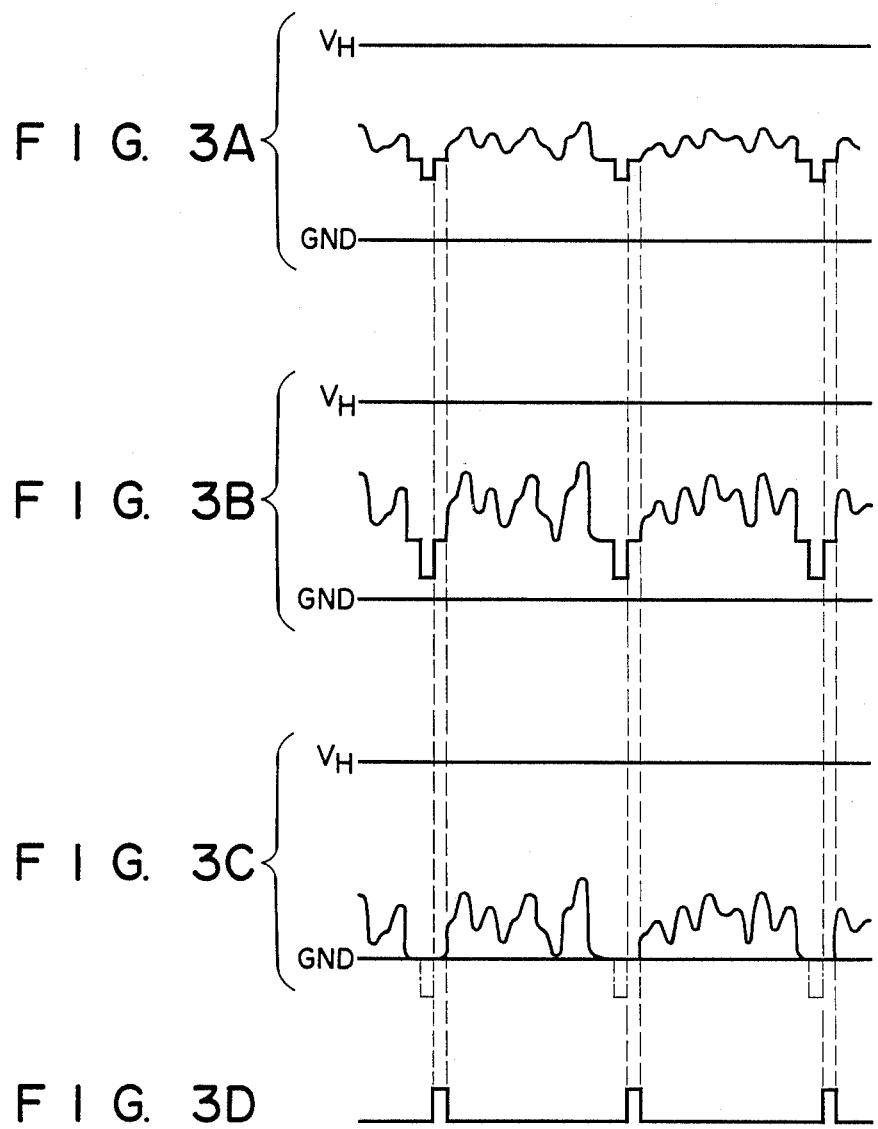

R,G,B LEVEL CONTROL IN A LIQUID CRYSTAL TV USING AVERAGE OF COMPOSITE VIDEO SIGNAL

BACKGROUND OF THE INVENTION

This invention relates to a circuit for controlling the level of a color video signal for allowing a television video signal to be A/D converted on a liquid crystal color television receiver.

Recently the so-called liquid crystal television receivers have been implemented with a liquid crystal display panel on a display unit. The liquid crystal television receiver converts video signals amplified at video amplifiers to digital signals by virtue of A/D converters and drives the liquid crystal display panel by the digital signal to permit images to be displayed on the liquid crystal display device. In the liquid crystal display panel, however, it has been difficult to obtain an image of better contrast due to a narrower gradation range from a white to a black level as considered from the characteristics.

A solution to this problem is made by setting an average potential level of video signals constant with the use of a high-pass filter and setting the upper and lower limit reference voltages of an A/D converter through a resistor division whereby it is possible to obtain a better constant.

FIG. 1 shows one from of an A/D converter in a conventional liquid crystal color television receiver. The A/D converter includes color demodulator 1, contrast control volume 2 connected to color demodulator 1, A/D converters 3, 4 and 5 of a parallel comparison type connected to color demodulator 1 and reference voltage generators 6, 7 and 8.

A composite color video signal is input to color demodulator 1 to produce primary color signals R, G and B. The primary color signals R, G and B are supplied to reference voltage generators 6 to 8 to generate upper and lower limit reference voltages $V_H$ and $V_L$. In this way, a bias is imparted to the video signal. A/D converters 3 to 5 convert the input video signals to digital signals DR1 to DR4, DG1 to DG4 and DB1 to DB4, respectively, in synchronism with a sampling clock so that they are delivered to liquid crystal drivers.

Since, however, the primary color signals R, G and B are supplied to reference voltage generators 6, 7 and 8, respectively, then corresponding different reference voltages are generated for A/D conversion. That is, the primary signals R, G and B are A/D converted based on the respective different voltages. When an image is to be displayed on the liquid crystal display unit on the basis of the digital signals after the A/D conversion has been achieved, the R:G:B ratio will be deviated from that of the original primary color signals R, G and B, so that these colors cannot faithfully be reproduced due to a consequent variation in the tone of colors.

SUMMARY OF THE INVENTION

It is accordingly the object of this invention to provide a circuit for controlling the level of a color video signal, which can faithfully reproduce colors on a liquid crystal television receiver.

In order to achieve the aforementioned object there is provided a circuit for controlling the level of a color video signal on a liquid crystal television receiver, which comprises a color demodulation circuit for demodulating a composite color video signal into primary color signals R (Red), G (Green) and B (Blue), amplifiers for amplifying the primary color signals demodulated by the color demodulation circuit, an automatic gain control circuit for receiving the composite color video signal and for controlling the amplification factor of the amplifier in accordance with the level of the composite color video signal, clamping circuits for clamping the primary color signals amplified by the amplifying circuits so that their aligned pedestal level is obtained, and A/D converters for converting the primary color signals having the pedestal levels aligned by the clamping circuit to digital signals for generating liquid crystal drive signals.

As set forth above, the circuit of this invention can attain a faithful color reproduction by uniformly amplifying primary color signals R, G and B by amplifiers connected to the automatic gain control circuit and, after clamped through the clamping circuits to obtain an aligned pedestal level, subjecting them to A/D conversion.

BRIEF DESCRIPTION OF THE DRAWINGS

FIGS. 3A to 3D show a time chart for explaining the operation of the embodiment of this invention.

DETAILED DESCRIPTION OF THE PREFERRED EMBODIMENTS

The embodiment of this invention will be explained below with reference to the accompanying drawings.

Figure 1:
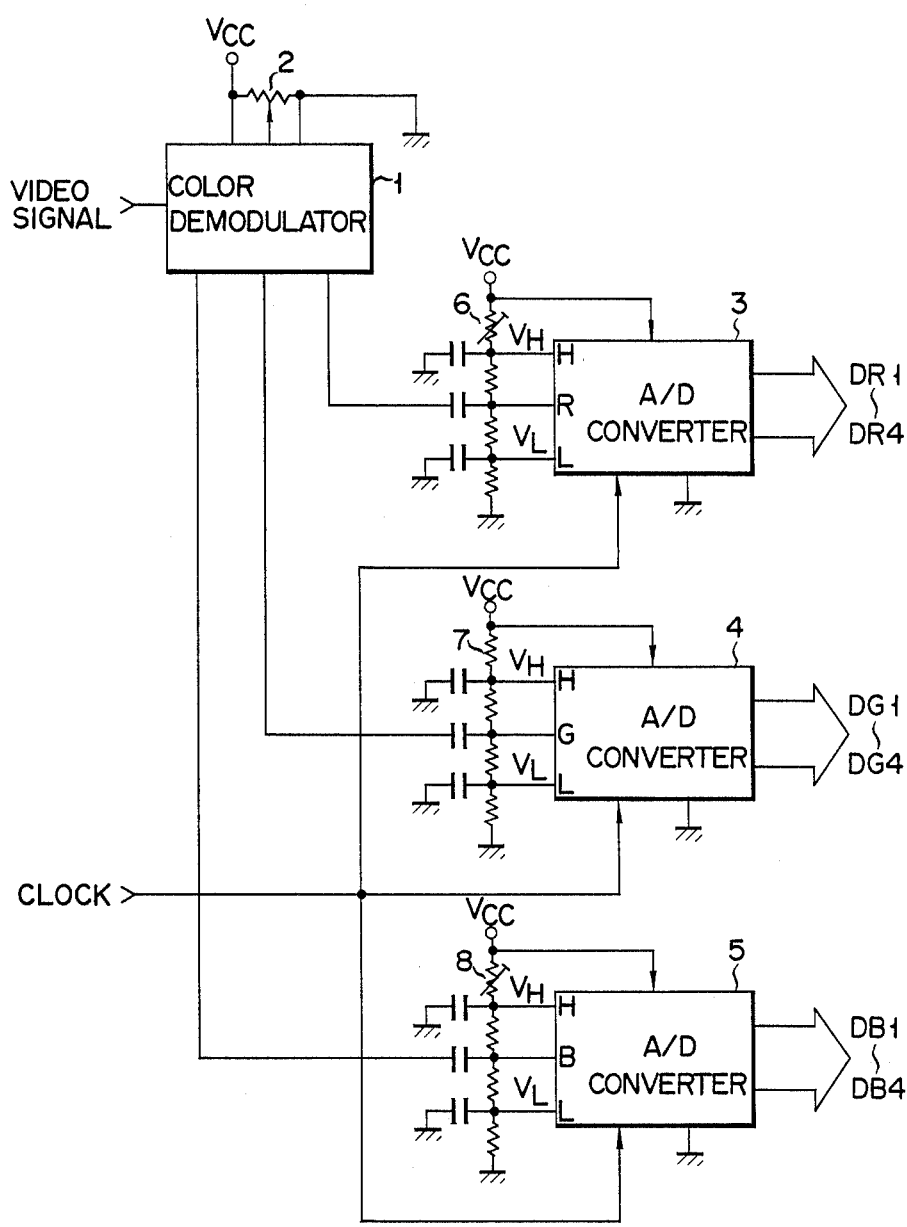
FIG. 1 shows a circuit for controlling the level of a color video signal on a conventional liquid crystal television receiver.
Figure 2:
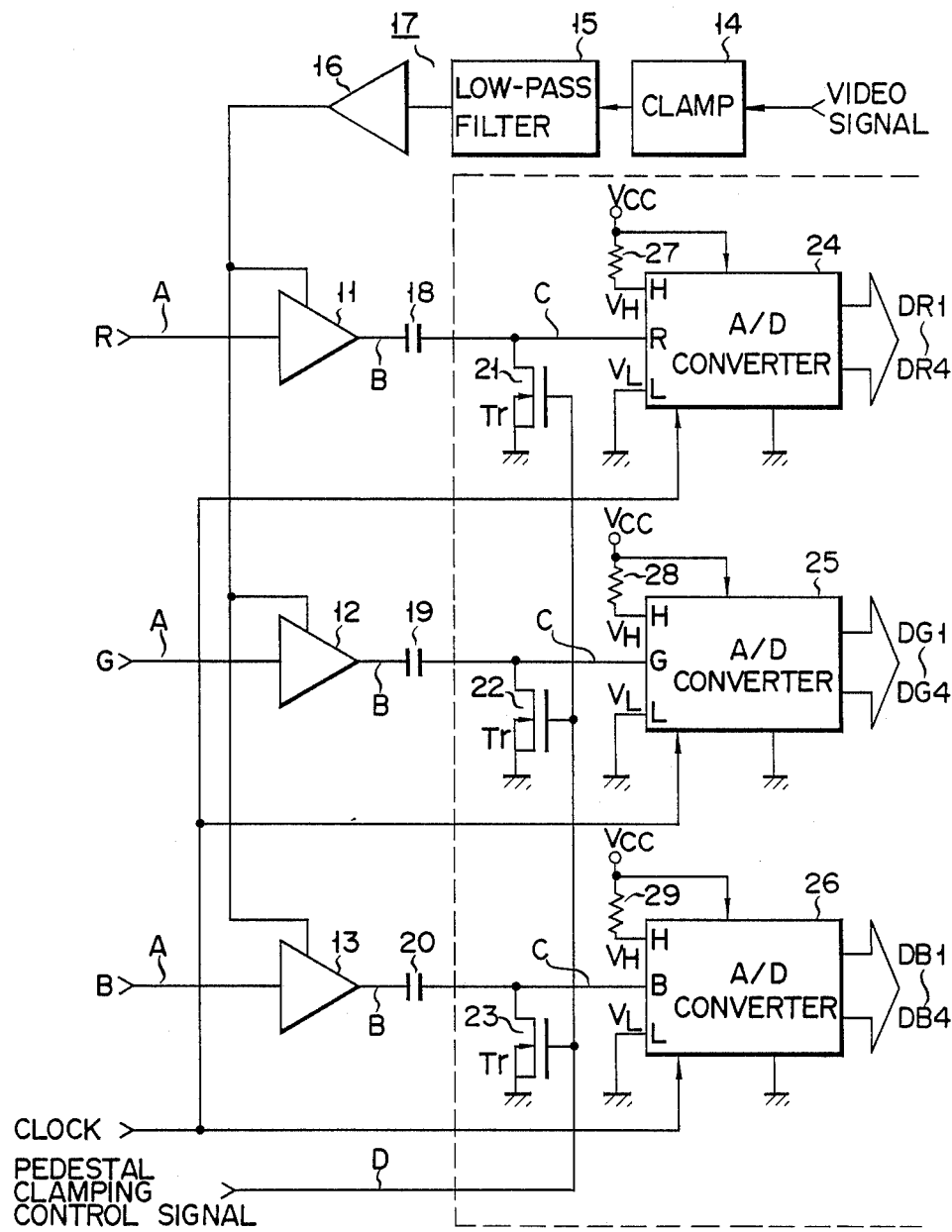
FIG. 2 is a circuit arrangement showing a color video signal level control circuit for a liquid crystal television receiver according to the embodiment of this invention.

In FIG. 2, amplifiers 11, 12 and 13 receive primary color signals R, G and B, as in the case of color demodulator 1, which are sent from a color demodulator. A video signal (brilliance signal) is supplied to the gain control terminals of amplifiers 11, 12 and 13 through clamping circuit 14, low-pass filter 15 and amplifier 16. The outputs of comparators 11, 12 and 13 are connected to A/D converters 24, 25 and 26 respectively through capacitors 18, 19 and 20, clamping circuits 21, 22 and 23 and A/D converters 24, 25 and 26. Clamping circuits 21, 22 and 23, each, are comprised of, for example, an NPN type MOS transistor Tr whose drain-to-source circuit is connected between the signal input terminal of the A/D converter (24, 25, 26) and ground. A pedestal clamping control signal is supplied from a control section, not shown, to the gate of the MOS transistor.

On the other hand, a Vcc power supply is fed as an operation voltage directly to, and as an upper limit reference voltage $V_H$ respectively through resistors 27, 28 and 29, to A/D converters 24, 25 and 26. A ground potential $V_L$ is supplied as a lower limit reference voltage $V_L$ to each of A/D converters 24, 25 and 26 and a sampling clock is supplied to A/D converters 24, 25 and 26. A/D converters 24, 25 and 26 subject the primary color signals to A/D conversion in synchronization with the clock and deliver display drive signals DR1 to DR4, DG1 to DG4 and DB1 to DB4 as output signals to a liquid crystal drive circuit.

The operation of the aforementioned embodiment will be explained below. The primary color signals R, G and B of the color demodulator are supplied to amplifiers 11, 12 and 13 where they are respectively amplified in which case the signal input waveform to amplifiers 11, 12 and 13 is illustrated in FIG. 3A and the amplified output waveform is illustrated in FIG. 3B. The outputs of amplifiers 11, 12 and 13 are supplied respectively through capacitors 18, 19 and 20 to clamping circuits 21, 22 and 23 at which time their pedestal level is aligned with a ground GND level. That is, clamping circuits 21, 22 and 23 receive pedestal clamping control signals as shown in FIG. 3D, while at the same time the MOS transistors Tr are in the ON state, so that the outputs of amplifiers 11, 12 and 13 have their pedestal levels aligned with the ground GND level as shown in FIG. 3C. In this case, the outputs of the clamping circuits 21, 22 and 23 are input to A/D converters 24, 25 and 26 with their pedestal levels aligned with the ground GND level. A/D converters 24, 25 and 26 subject the input primary color signals R, G and B to A/D conversion in synchronization with the sampling clock and deliver DR1 to DR4, DG1 to DG4 and DB1 to DB4 as digital signals to a liquid crystal drive circuit.

Automatic gain control circuit 17 clamps input video signals at clamping circuit 14 for their pedestal levels to obtain alignment, produces an average of the aligned signals passed through low-pass filter 15, and obtains a predetermined-level voltage at amplifier 16. The output of automatic gain control circuit 17 is supplied to amplifiers 11, 12 and 13 for concurrent gain control to be performed at the same level. The amplification factor at this time is such that it becomes greater as the output level of amplifier 16 is decreased. By so doing, amplifiers 11, 12 and 13 amplify the primary color signals R, G and B uniformly. As a result, A/D converters 24, 25 and 26 deliver digital signals DR1 to DR4, DG1 to DG4 and DB1 to DR4 corresponding to the primary color signals R, G and B, which have been sent from the broadcasting station, to a display unit where they are faithfully reproduced on the display section.

What is claimed is:

1. A circuit for controlling the level of a color video signal on a liquid crystal television receiver, comprising:
   a color demodulation circuit for decoding a composite color video signal into primary color signals R (Red), G (Green) and B (Blue);
   amplifying means for amplifying the respective primary color signals demodulated by the color demodulation circuit;
   an automatic gain control means for receiving the composite color video signal and for controlling an amplification factor of the amplifying means in accordance with the level of the composite color video signal;
   clamping means for clamping the primary color signals amplified by the amplifying means so that their aligned pedestal level is obtained; and
   A/D converting means for converting the primary color signals having the pedestal levels which are aligned by said clamping means to digital signals for liquid crystal drive.

2. The circuit according to claim 1, wherein said automatic gain control means comprises:
   a clamping circuit for clamping the pedestal level of said composite color video signal;
   a low-pass filter for obtaining an average voltage of composite color video signals whose pedestal levels are aligned by the clamping circuit; and
   an amplifier for amplifying said average voltage delivered from said low-pass filter and generating a control signal for controlling the amplification factor of said amplifying means.

3. The circuit according to claim 1, wherein said amplifying means is comprised of amplifiers whose amplification factors become greater with a decreasing control voltage which is delivered from said automatic gain control means.

4. The circuit according to claim 1, wherein said A/D converting means is such that its signals have their upper and lower limit voltage levels fixed.

* * * * *